(12) United States Patent
Hsu

(10) Patent No.: US 8,554,466 B2
(45) Date of Patent: Oct. 8, 2013

(54) ULTRAVIOLET DETECTION SYSTEM AND METHOD THEREOF

(75) Inventor: Shu Hao Hsu, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 736 days.

(21) Appl. No.: 12/710,651

(22) Filed: Feb. 23, 2010

(65) Prior Publication Data
US 2010/0228735 A1 Sep. 9, 2010

(30) Foreign Application Priority Data

Mar. 9, 2009 (TW) ................................. 98107497 A (51) Int. Cl.
*G06F 19/00* (2011.01)

(52) U.S. Cl.
USPC .................... 701/408; 713/323; 455/456.3

(58) Field of Classification Search
USPC ............ 701/408; 455/457, 574, 414.1, 456.3; 713/323
See application file for complete search history.

(56) References Cited

U.S. PATENT DOCUMENTS

| 2002/0004691 A1* | 1/2002 | Kinashi et al. | 701/4 |
| 2005/0237347 A1* | 10/2005 | Yamaji et al. | 347/5 |
| 2005/0288038 A1* | 12/2005 | Kim | 455/456.3 |
| 2006/0270421 A1* | 11/2006 | Phillips et al. | 455/457 |
| 2007/0244633 A1* | 10/2007 | Phillips et al. | 701/207 |
| 2008/0058032 A1* | 3/2008 | Yamaji et al. | 455/574 |

FOREIGN PATENT DOCUMENTS

JP 11264760 A 9/1999

OTHER PUBLICATIONS

Chinese Patent Office, Office Action 0910142CN, Dec. 31, 2010, pp. 1-5.

* cited by examiner

*Primary Examiner* — Ronnie Mancho
(74) *Attorney, Agent, or Firm* — Edell, Shapiro & Finnan, LLC (57) ABSTRACT

An ultraviolet detection system comprises a global positioning device for receiving signals transmitted from global positioning satellites, and generating global positioning satellite distribution data and current position data; and a processor, coupled to the global positioning device, for generating ultraviolet intensity information according to the current position data and the global positioning satellite distribution data. The processor generates ultraviolet intensity information more accurately according to a current time data, which is transmitted from the global positioning satellite or is automatically generated from the global positioning device.

15 Claims, 8 Drawing Sheets

| Current position | First current time | Satellite distribution data | Second current time | Ultraviolet intensity |
|---|---|---|---|---|
| Taipei | Jan. 1 | | AM7:00~AM9:00 | Medium |
| | | the sky right above is sheltered | AM11:00~PM1:00 | Weak |
| | | | ...... | ...... |
| | | | AM1:00~AM3:00 | NA |
| | | the sky at the included elevation angle between 30 to 50 degrees in the east is sheltered | AM7:00~AM9:00 | Weak |
| | | ...... | ...... | ...... |
| | ...... | ...... | ...... | ...... |
| | ...... | ...... | ...... | ...... |
| ...... | | | | |

ULTRAVIOLET DETECTION SYSTEM AND METHOD THEREOF

CROSS REFERENCE TO RELATED PATENT APPLICATION

This patent application is based on Taiwan, R.O.C. patent application No. 098107497 filed on Mar. 9, 2009.

FIELD OF THE INVENTION

The present invention relates to an ultraviolet detection system, and more particularly, to an ultraviolet detection system integrated with a navigation device.

BACKGROUND OF THE INVENTION

A navigation device, such as an automobile GPS system, is widely used in the daily life of modern people. While some common navigation devices only provide positioning and navigation functions, other navigation devices are integrated with mobile communication devices for better overall versatility. However, with respect to information needed in daily life, the prevailing navigation devices do not yet serve as tools for gathering such information.

For example, in order to gather complete information of ultraviolet intensities, a meteorological observatory places ultraviolet detection devices at different locations to detect ultraviolet intensity. However, not only is it difficult to maintain ultraviolet detection modules placed at different locations, but building and maintenance costs for placing the ultraviolet detection modules in multiple locations is also expensive.

For a person wishing to go outdoors, the ultraviolet intensity may be a factor for deciding whether to bring something ultraviolet-proof such as sunscreen or a sunshade umbrella, to impact a travel schedule. Therefore, to better plan and thus enjoy the travel, being able to detect the ultraviolet intensity while traveling outdoors could be particularly helpful.

SUMMARY OF THE INVENTION

With respect to the foregoing problem, an object of the present invention is to provide an ultraviolet detection system and a method thereof, so that a real-time ultraviolet intensity at a current location is obtained by a person or an automobile.

In order to achieve the foregoing object, an ultraviolet detection system is provided according to an embodiment of the present invention. The system comprises a global positioning device for receiving signals transmitted from global positioning satellites, and generating global positioning satellite distribution data and current position data; and a processor, coupled to the global positioning device, for generating ultraviolet detection intensities according to the current position data and the global positioning satellite distribution data.

An ultraviolet detection system is provided according to another embodiment of the present invention. The system comprises a timing device for providing current time data; a global positioning device, for receiving signals transmitted from global positioning satellites and generating global positioning satellite distribution data and current position data; and a processor, coupled to the timing device and the global positioning device, for generating ultraviolet detection intensities according to the current time data, the current position data and the global positioning satellite distribution data.

An ultraviolet detection method is provided according to another embodiment of the present invention. The method comprises providing current time data; receiving signals transmitted from global positioning satellites and generating global positioning satellite distribution data and current position data; and generating ultraviolet detection intensities according to the current time data, the current position data and the global positioning satellite distribution data.

Therefore, according to the invention, a global positioning device obtains a current position of a user via signals transmitted from global positioning satellites, acquires a radiating angle and direction of the sun relative to the user according to the current position as well as time data, and determines a sheltering situation of ultraviolet lights sheltered by geographical objects, so that an ultraviolet intensity value is obtained.

DETAILED DESCRIPTION OF THE PREFERRED EMBODIMENT

Figure 1:
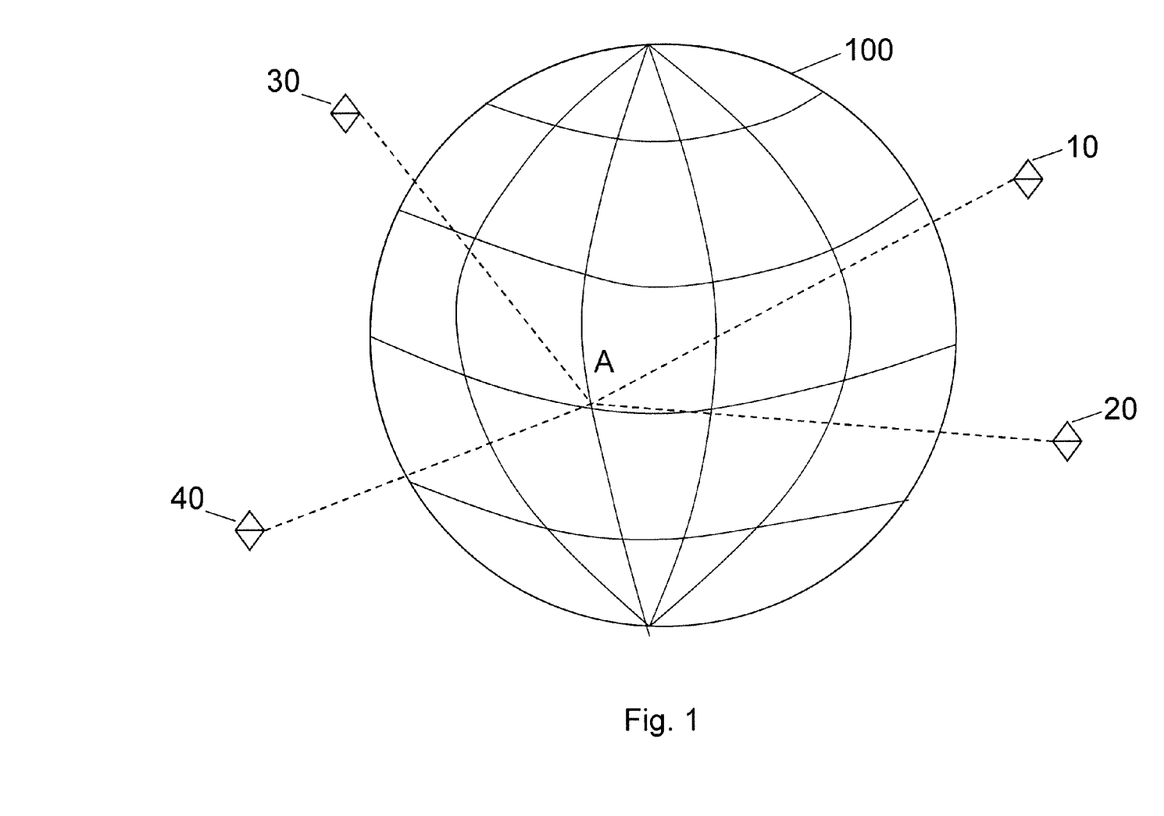
FIG. 1 is a schematic diagram of global positioning satellites locating a position on the earth in the prior art.

FIG. 1 shows global positioning satellites 10, 20, 30 and 40 locating a position on the earth in accordance with the prior art. A point A is a position of a global navigation satellite system on the surface of the earth 100. The global positioning satellites 10, 20, 30 and 40, which are distributed in orbits of the satellites, transmit signals to the earth 100, such that the global navigation satellite system receives the signals from different satellites and obtains position data of the point A on the surface of the earth 100 from processing the signals transmitted from the orbits. Generally, a position on the surface of the earth 100 is scientifically defined by latitude and longitude data. Therefore, the position data obtained by the global navigation satellite system may be a latitude and longitude data. The satellites referred to in the present invention may be, for example, an American GPS satellite system, a Russian Global Navigation Satellite System (GLONASS), an European Galileo Satellite Positioning System (GALILEO), and the like.

Figure 2:
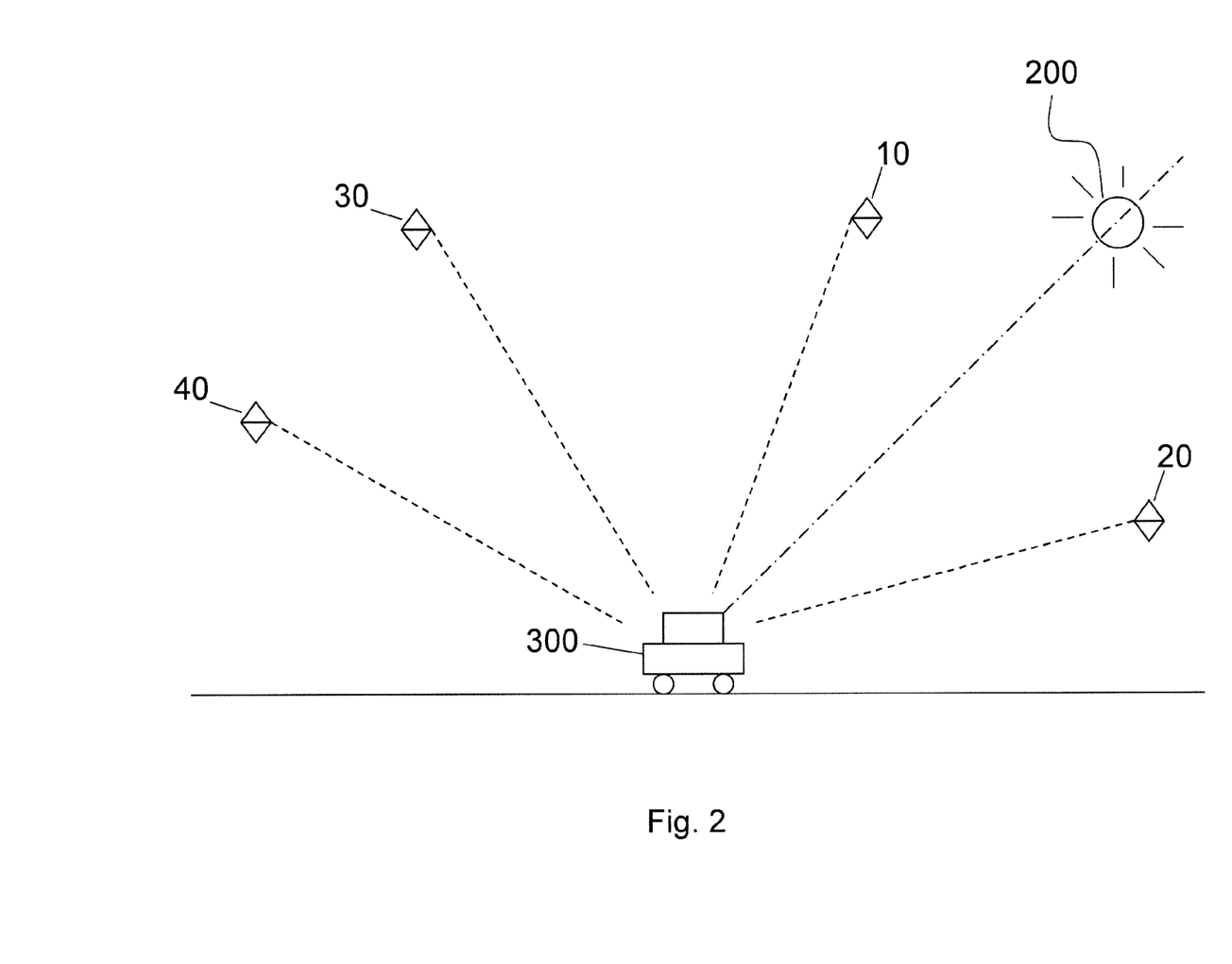
FIG. 2 is a schematic diagram of an automobile with a navigation device on the earth and receiving signals transmitted from global positioning satellites and positions of the sun.

FIG. 2 shows positions of the sun, and an automobile 300 with a navigation device on the earth and receiving signals transmitted from global positioning satellites. As mentioned above, after receiving the signals transmitted from the global positioning satellites 10, 20, 30 and 40, the navigation device obtains latitude and longitude data of a current position of the automobile 300. At this point, an approximate position of the sun 200 in space and ultraviolet intensity information at the position of the automobile 300 are estimated accordingly when a current time is obtained. For example, after receiving the signals from the global positioning satellites, the navigation device obtains current position data, e.g., at the equator or 30 degrees north latitude, and a time data, e.g., 12 o'clock on April $15^{th}$, 1 o'clock am on April $15^{th}$, or 12 o'clock on January $15^{th}$. At this point, ultraviolet intensity information is generated according to the current position data in conjunction with the time data. In continuation with the above example, when the position data is that the automobile 300 is at the equator and the current time is 12 o'clock noon on April $15^{th}$, it is determined that the automobile 300 receives direct rays from the sun 200, and ultraviolet intensity information indicates a strongest level; when the position data is that the automobile 300 is at the equator and the current time is 1 o'clock am on April $15^{th}$, since the automobile 300 does not receive rays from the sun 200 at night, ultraviolet intensity information indicates a weakest level. When the position data is that the automobile 300 is at 30 degrees north latitude and the current time is 12 o'clock noon on January $15^{th}$, although the sun 200 is near the earth at this point, the sun 200 only indirectly radiates the earth due to the inclination of the earth axis, and thus ultraviolet intensity information indicates a medium level. Accordingly, ultraviolet detection intensities of outdoor environments are estimated via a positioning function of the navigation device.

Figure 3:
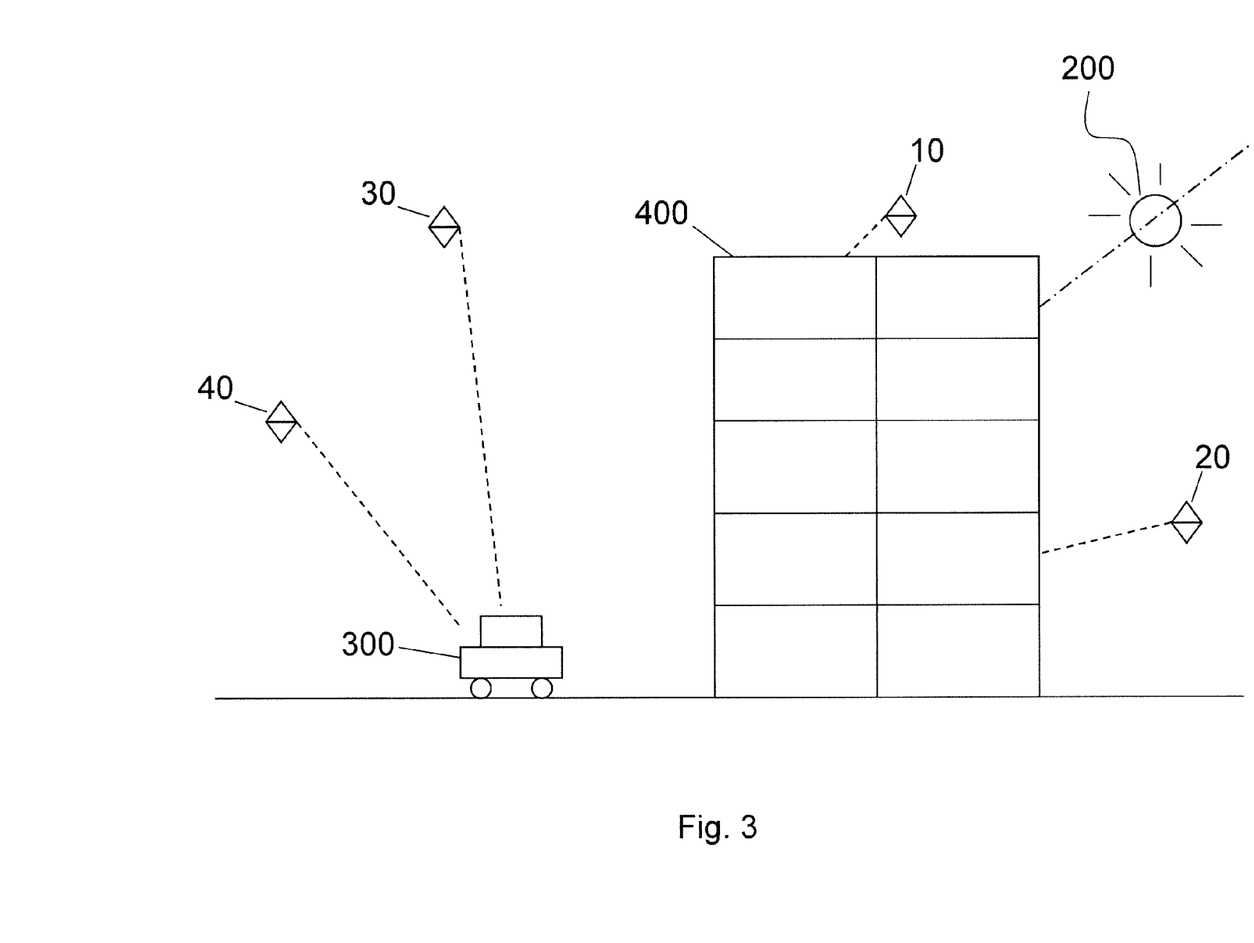
FIG. 3 is a schematic diagram showing positions of the sun, and an automobile, located near a building and having a navigation device, receiving signals transmitted from global positioning satellites and the position of the sun.

According to measured statistics, clouds are poor shelters against most ultraviolet rays, whereas shelters formed by buildings or by other geographical environments are capable of effectively blocking ultraviolet rays. Therefore, sheltering objects, such as skyscrapers in a city, need to be taken into consideration when estimating the ultraviolet detection intensities of the outdoor environments. FIG. 3 shows a schematic diagram of relative positions of an automobile 300 with a navigation device and located near a building 400, and satellites 10, 20, and 40, and the sun 200. Being sheltered by the building 400, the automobile 300 does not receive direct rays from the sun 200, and accordingly the intensity of ultraviolet light received by the automobile 300 is reduced from that when automobile 300 receives direct rays from the sun 200. A method for calibrating the ultraviolet intensity for adapting to the above situation is described below. Referring to FIG. 3, the building 400 not only shelters the sun 200 but also satellite signals from the global positioning satellites 10 and 20. Since the global positioning satellites are regarded as being uniformly distributed in the space, a range where the navigation device cannot receive signals from the global positioning satellites is defined as a sheltered range. When the navigation device in the sheltered range cannot receive direct rays from the sun 200, it is determined that the sun 200 is sheltered, and accordingly the intensity of ultraviolet lights received by the automobile 300 is reduced by the calibration approach below.

Figure 4:
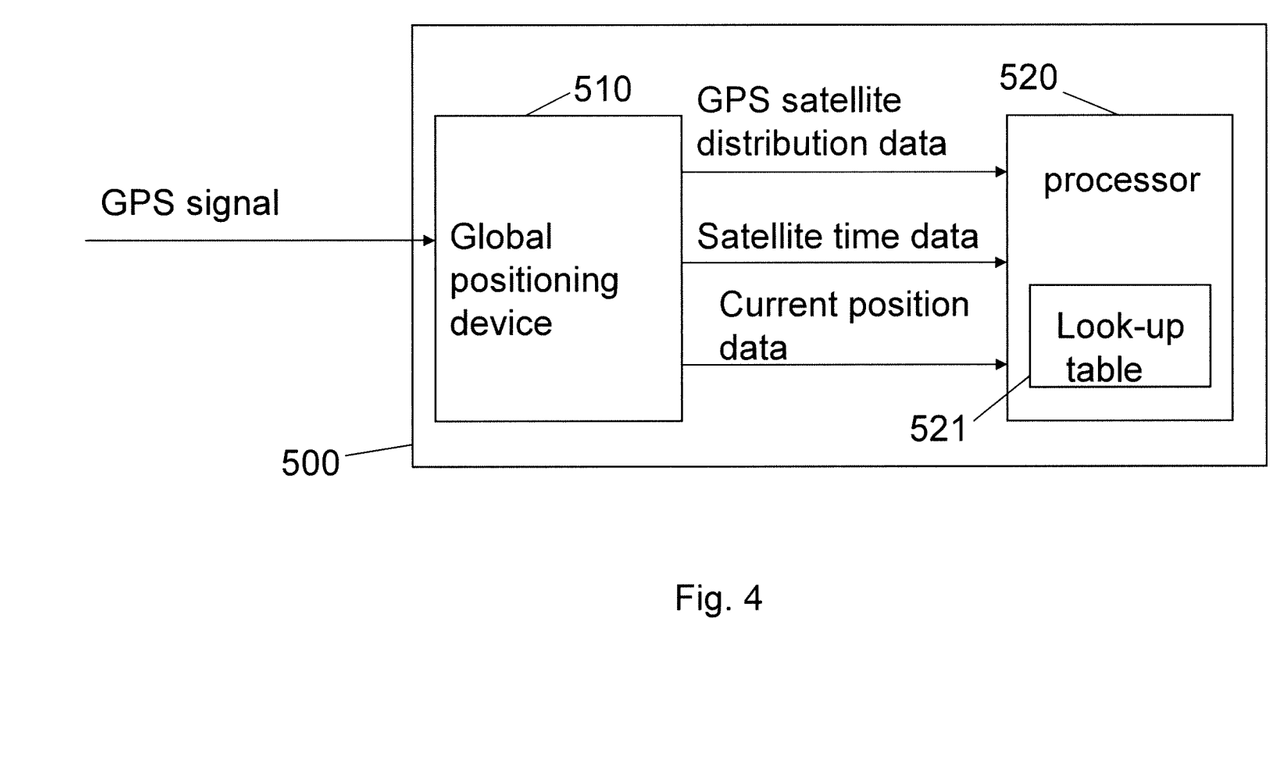
FIG. 4 is a block diagram of an ultraviolet detection system in accordance with a first embodiment of the present invention.

FIG. 4 shows a block diagram of an ultraviolet detection system 500 in accordance with a first embodiment of the present invention, the ultraviolet detection system 500 comprises a global positioning device 510 and a processor 520. After receiving signals from global positioning satellites, the global positioning device 510 generates global positioning satellite distribution data, and current position data represented by latitude and longitude data for example. The signals from the global positioning satellites comprise current satellite time data, which the processor 520 receives along with the latitude and longitude data to obtain relative positions of the sun and the ultraviolet detection system 500 by looking up in or querying a look-up table 521. For example, the processor 520 converts the current satellite time data to a current time at the location of the ultraviolet detection system 500, and obtains an angle and direction of ultraviolet lights received from the sun by the ultraviolet detection system 500 via the current time in conjunction with the latitude and longitude data. After that, the processor 520 determines whether sheltering objects exist to estimate coarse ultraviolet intensity information according to the relative position of the sun and distribution data of the global positioning satellites. The processor 520 further generates more accurate ultraviolet intensity information according to the current time at the location of the ultraviolet detection system 500. For example, the processor 520 obtains more accurate and reliable ultraviolet intensity information via an hour component, a minute component and a second component of the current time and the coarse ultraviolet intensity information. It is to be noted that, in this embodiment, the latitude and longitude data is disclosed for illustration purposes, and other simple modifications of positioning coordinates, such as using a city name or an area name as a position classification basis, are within the scope and spirit of the present invention.

Figure 5:
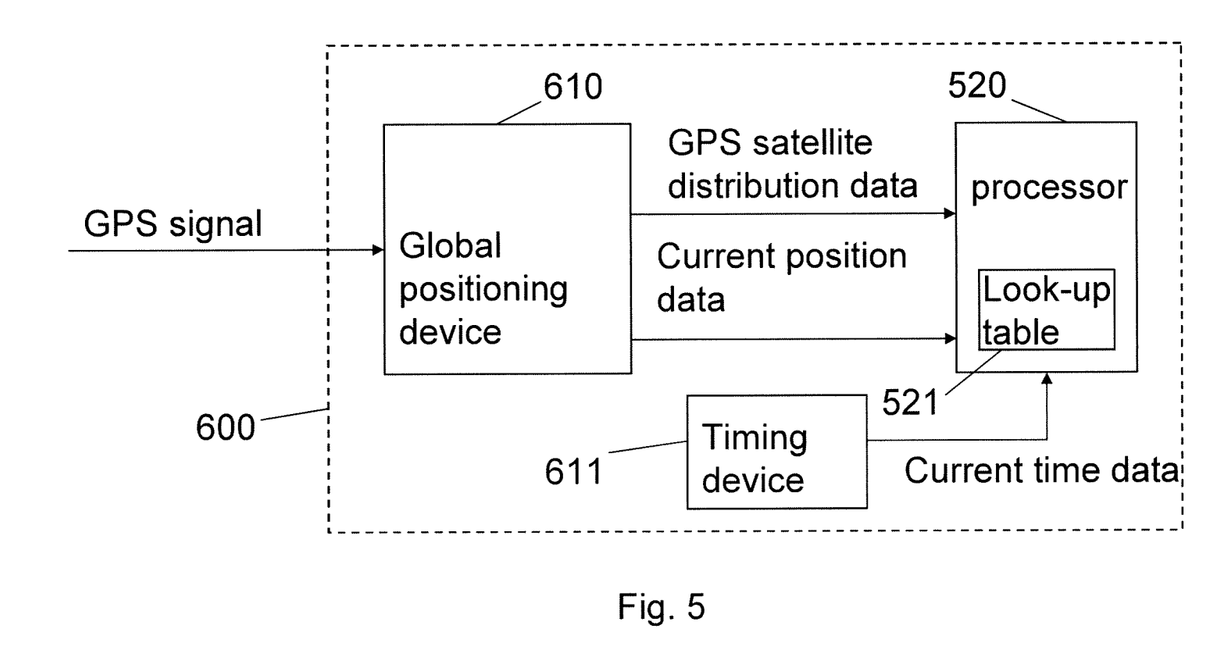
FIG. 5 is a block diagram of an ultraviolet detection system in accordance with a second embodiment of the present invention.

FIG. 5 shows a block diagram of an ultraviolet detection system 600 in accordance with a second embodiment of the present invention. A difference from the first embodiment is that a global positioning device 610 in the second embodiment further comprises a timing device 611. The current time data needed by the processor 520 is provided by the timing device 611 instead of being obtained from converting the satellite time data.

Figure 6:
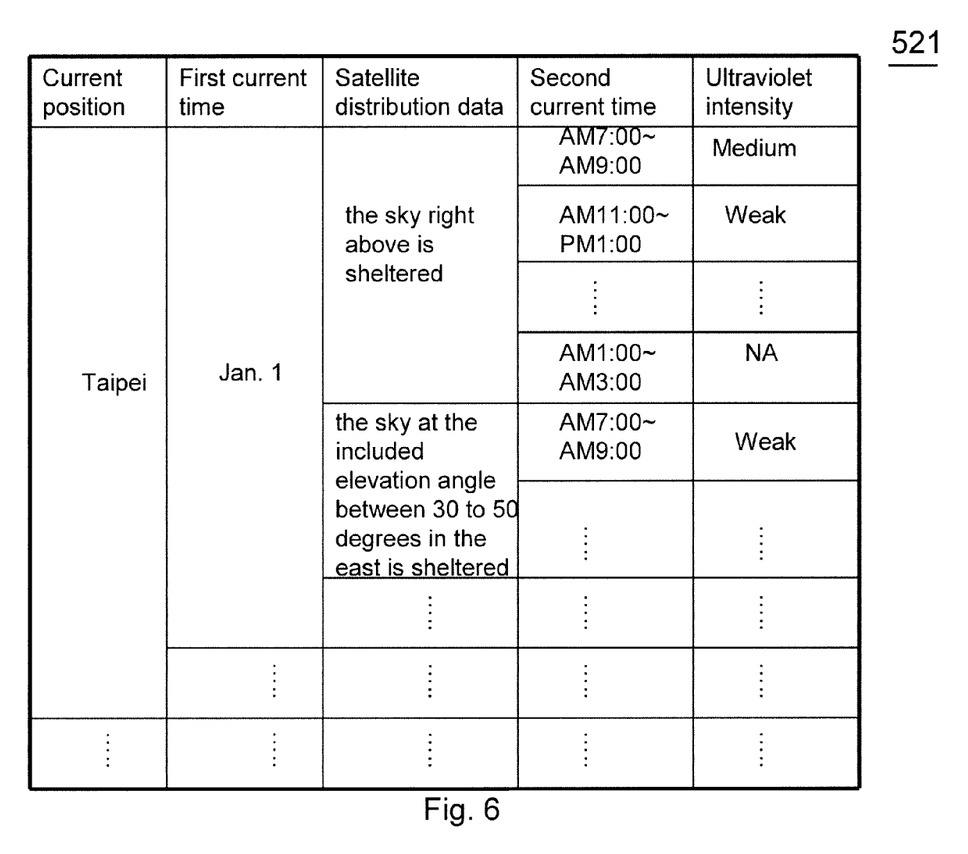
FIG. 6 is a schematic diagram of a look-up table in accordance with the first embodiment and the second embodiment of the present invention.
Figure 7:
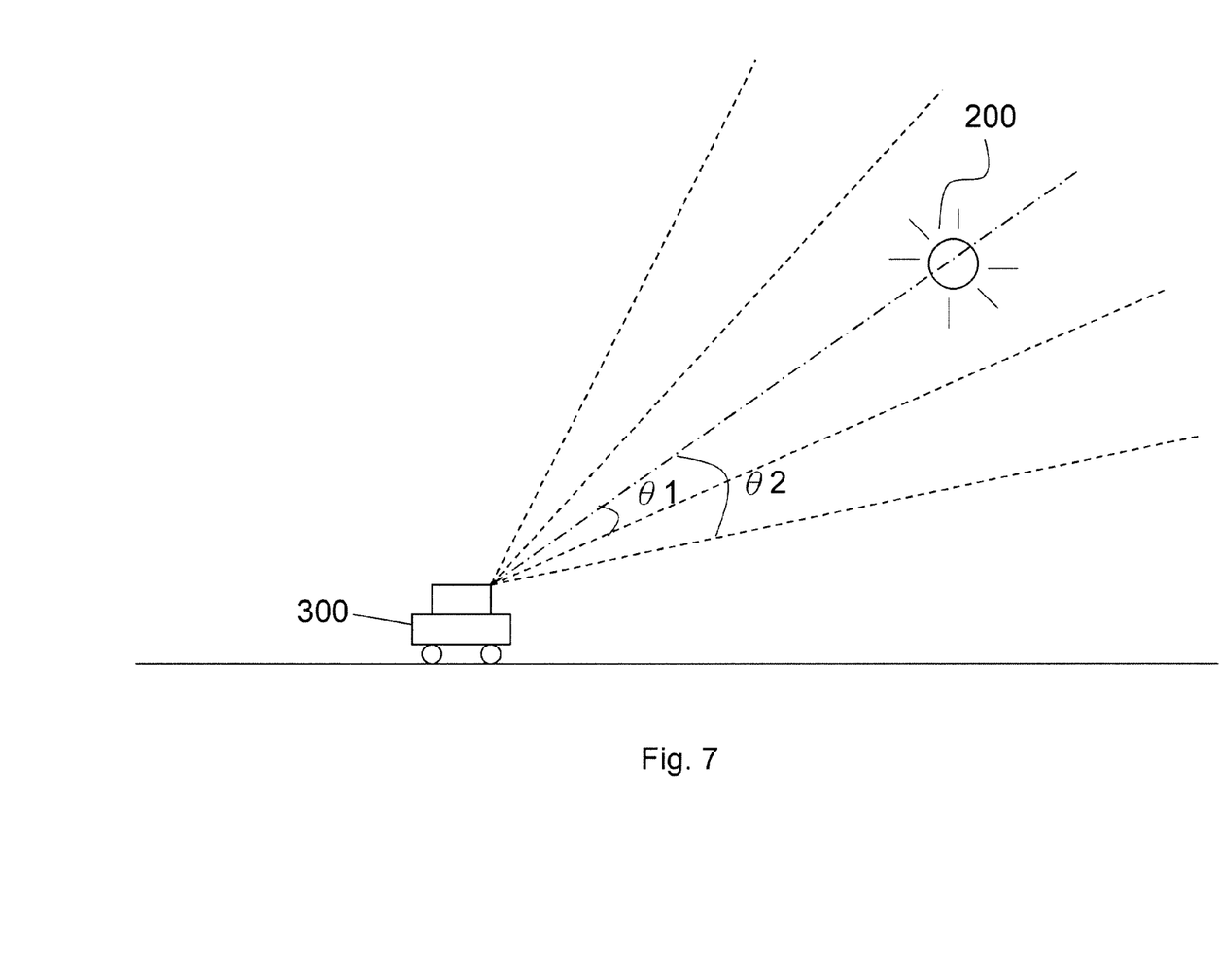
FIG. 7 is a schematic diagram of dividing the space into three different areas.

FIG. 6 shows a block diagram of the look-up table 521 in accordance with the first and second embodiments of the present invention. The look-up table 521 comprises a current position column, a first current time column, a satellite distribution data column and a second current time column. The current position column is mainly for representing a position of a navigation device, and is classified according to city names in this embodiment. As mentioned above, the current position column is represented by latitude and longitude data. The first current time column is mainly for representing an approximate on-earth position being directly radiated by the sun, and relative positions of the navigation device and the sun are obtained from the approximate position in conjunction with the data of the current position column. The satellite distribution data column records a distribution of global positioning satellites from which signals can be received to determine geographical shelters in order to calibrate the ultraviolet intensity information. In this embodiment, the horizontal area is regarded as a reference zero degree, and the calibration of the ultraviolet intensity information is based on a sheltered range within an elevation angle with respect to a certain direction above the horizontal area. For example, the sheltered range is an included elevation angle between 30 to 50 degrees in the east or a space right above. In another embodiment, with the navigation device as a vertex, a connecting line between the navigation device and the sun serves as a reference line, and an area within an included range between a particular angle and the connecting line is a foundation for dividing the space. Referring to FIG. 7, the space is divided into three areas: an area within an included angle $\theta 1$, an area within an included angle greater than the angle $\theta 1$ and smaller than an angle $\theta 2$, and an area greater than the angle $\theta 2$. The processor 520 generates coarse ultraviolet intensity information according to the relative positions of the sun and the global positioning satellite distribution data. The approximate position of the sun in the space of the position of the navigation device is determined according to a time recorded in the second current time column. When the elevation angle gets closer to 90 degrees, it means that the time gets closer to the noon, and at this time the position of the navigation device has a strongest indicated ultraviolet intensity information. By integrating the coarse ultraviolet intensity information and the second current time column, more accurate ultraviolet intensity information is obtained. Accordingly, the ultraviolet intensity information is obtained by looking up in or querying a look-up table. Take the embodiment illustrated in FIG. 6 as an example. From 7 o'clock to 9 o'clock in the morning on January 1$^{st}$ in Taipei, when the space right above is sheltered, the ultraviolet intensity information indicates medium; when the area between 30 degrees to 50 degrees in the east is sheltered, the ultraviolet intensity information indicates weak since the sun is also included in the sheltered range.

Figure 8:
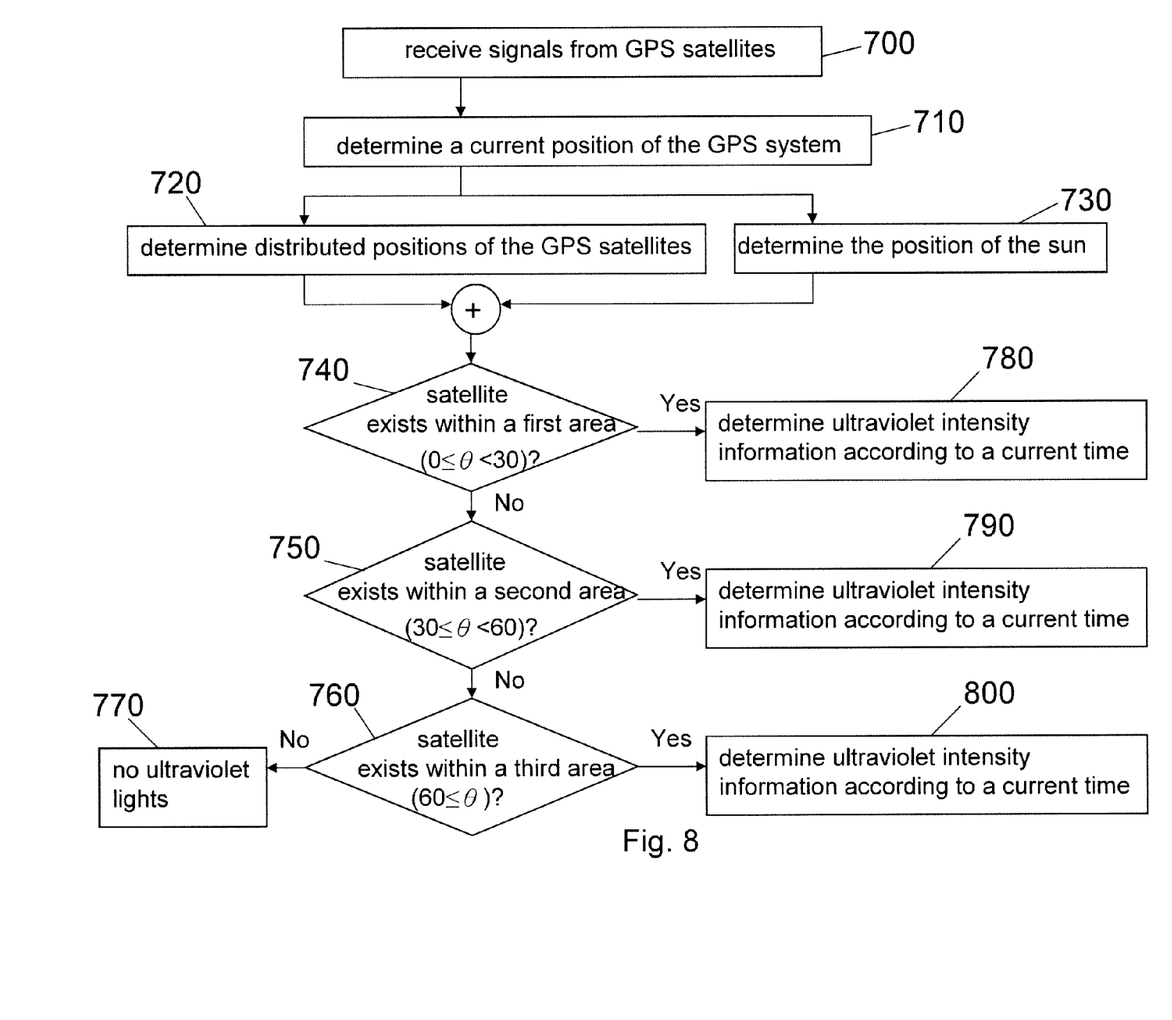
FIG. 8 is a flow chart of an ultraviolet detection method in accordance with an embodiment of the present invention.

FIG. 8 shows a flow chart of an ultraviolet detection method in accordance with an embodiment of the present invention. The foregoing approach implementing the connecting line between the navigation device and the sun as the reference line is further described below, where the angle θ1 is 30 degrees and the angle θ2 is 60 degrees, for example. The method comprises steps below.

In Step 700, signals from global positioning satellites are received.

In Step 710, a current position of the navigation device is determined according to the signals received from the global positioning satellites.

In Step 720, distributed positions of the global positioning satellites are determined according to the signals received from the global positioning satellites.

In Step 730, the position of the sun is determined according to the signals received from the global positioning satellites.

In Step 740, it is determined whether any satellite exists within a first area (0≤θ<30). Step 780 is performed when the answer is yes; otherwise, Step 750 is performed.

In Step 750, it is determined whether any satellite exists within a second area (30≤θ<60). Step 790 is performed when the answer is yes; otherwise, Step 760 is performed.

In Step 760, it is determined whether any satellite exists within a third area (60≤θ). Step 800 is performed when the answer is yes; otherwise, Step 770 is performed.

In Step 770, it is determined that no ultraviolet light is present.

In Step 780, 790 and 800, ultraviolet intensity information is determined according to a current time.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An ultraviolet detection system, comprising:
   a global positioning device, for receiving signals from global positioning satellites and generating global positioning satellite distribution data and current position data; and
   a processor, coupled to the global positioning device, for generating ultraviolet intensity information according to the current position data and the global positioning satellite distribution data.

2. The ultraviolet detection system as claimed in claim 1, wherein the current position data is latitude and longitude data, the signals transmitted from the global positioning satellites further comprise satellite time data, the processor is configured to access a look-up table, and relative positions of the sun and the ultraviolet detection system are determined by looking up in the look-up table according to the latitude and longitude data.

3. The ultraviolet detection system as claimed in claim 2, wherein the processor generates the ultraviolet intensity information according to the relative positions and the global positioning satellite distribution data.

4. The ultraviolet detection system as claimed in claim 3, wherein the processor generates the ultraviolet intensity information according to the satellite time data.

5. An ultraviolet detection system, comprising:
   a timing device, for providing current time data;
   a global positioning device, for receiving signals from global positioning satellites and generating global positioning satellite distribution data and current position data; and
   a processor, coupled to the timing device and the global positioning device, for generating ultraviolet intensity information according to the current time data, the current position data and the global positioning satellite distribution data.

6. The ultraviolet detection system as claimed in claim 5, wherein the processor is configured to access a look-up table, the current position data is latitude and longitude data, and relative positions of the sun and the ultraviolet detection system are determined by looking up in the look-up table according to the latitude and longitude data and the current time data.

7. The ultraviolet detection system as claimed in claim 6, wherein the processor generates the ultraviolet intensity information according to the relative positions and the global positioning satellite distribution data.

8. The ultraviolet detection system as claimed in claim 7, wherein the processor generates the ultraviolet intensity information according to the current time data.

9. An ultraviolet detection method, comprising:
   providing current time data;
   receiving signals from global positioning satellites, and generating global positioning satellite distribution data and current position data; and
   generating ultraviolet intensity information according to the current time data, the current position data and the global positioning satellite distribution data.

10. The ultraviolet detection method as claimed in claim 9, wherein the current position data is latitude and longitude data, and relative positions of the sun and the ultraviolet detection system are determined by looking up in a look-up table according to the latitude and longitude data and the current time data.

11. The ultraviolet detection method as claimed in claim 10, wherein the ultraviolet intensity information is generated according to the relative positions and the global positioning satellite distribution data.

12. The ultraviolet detection method as claimed in claim 11, wherein the ultraviolet intensity information is generated further according to the current time data.

13. The ultraviolet detection system as claimed in claim 1, wherein the global positioning satellite distribution data is generated according to which signals of the global positioning satellites can be received in order to determine geographical shelters.

14. The ultraviolet detection system as claimed in claim 5, wherein the global positioning satellite distribution data is generated according to which signals of the global positioning satellites can be received in order to determine geographical shelters.

15. The ultraviolet detection method as claimed in claim 9, wherein the global positioning satellite distribution data is generated according to which signals of the global positioning satellites can be received in order to determine geographical shelters.

\* \* \* \* \*